(12) United States Patent
Wielgosch

(10) Patent No.: US 8,479,442 B2
(45) Date of Patent: Jul. 9, 2013

(54) SYSTEM AND METHOD FOR SHAPING PLANTS

(76) Inventor: Norbert Wielgosch, Meeder (DE)

( * ) Notice: Subject to any disclaimer, the term of this patent is extended or adjusted under 35 U.S.C. 154(b) by 160 days.

(21) Appl. No.: 13/026,237

(22) Filed: Feb. 12, 2011

(65) Prior Publication Data
US 2012/0066798 A1 Mar. 15, 2012

(30) Foreign Application Priority Data

Sep. 9, 2010 (DE) .......................... 10 2010 044 907

(51) Int. Cl.
*A01G 7/00* (2006.01)
(52) U.S. Cl.
USPC ..................................... 47/4; 47/44; 800/323
(58) Field of Classification Search
USPC .......................... 47/4, 44, 45, 46, 47; 800/323
See application file for complete search history.

(56) References Cited

U.S. PATENT DOCUMENTS

| | | | |
|---|---|---|---|
| 193,969 A | 8/1877 | Laprade | |
| 3,611,633 A | 10/1971 | Shackelford | |
| 4,000,580 A * | 1/1977 | Biehl | 47/14 |
| 4,190,984 A | 3/1980 | Pierce | |
| 4,328,641 A | 5/1982 | Tesch | |
| 4,361,982 A | 12/1982 | Horowitz | |
| D286,259 S | 10/1986 | Evans | |
| 4,777,787 A | 10/1988 | Warren | |
| 4,920,695 A | 5/1990 | Garden | |
| 5,134,969 A * | 8/1992 | Mason et al. | 119/472 |
| 5,321,908 A | 6/1994 | Ushimaru | |
| 5,579,603 A | 12/1996 | Fukuzumi | |
| 6,725,601 B2 | 4/2004 | Chick | |
| 7,703,239 B2 | 4/2010 | Steele | |
| 7,757,436 B2 | 7/2010 | Bindschedler et al. | |
| 2010/0031564 A1 | 2/2010 | Loebl et al. | |
| 2010/0095584 A1 | 4/2010 | Huet et al. | |
| 2010/0206239 A1 * | 8/2010 | Margerum et al. | 119/246 |
| 2011/0030273 A1 | 2/2011 | Soupe | |

FOREIGN PATENT DOCUMENTS

| | | |
|---|---|---|
| CN | 1799322 | 7/2006 |
| DE | 199771 | 6/1908 |
| DE | 19604891 | 9/1997 |
| JP | 6070644 | 3/1994 |

OTHER PUBLICATIONS

"Espalier—The Art of Training Your Tree", retrieved online at http://www.laffodils.com/Tree_Espalier.html, 2011, 2pp.
"Vegitated Furniture: A Green Growing Room Divider", retrieved online at http://dornob.com/vegitated-furniture-a-green-growing-room-divider/, 2011, 1p.
Amanda Smith, "Livinglass—Decorative Eco-Friendly Glass", 3rings—A Product Blog for Landscape+Design, Sep. 29, 2010, retrieved from http://3rings.designerpages.com/2010/09/29/livinglass-decorative-eco-friendly-glass/, 4pp.
"How to Get a Blue Atlas Cedar to Grow Flat Against a Wall", retrieved online at http://www.ehow.com/how_5258339_blue-grow-flat-against-wall.html, 2011, 6pp.
"Espaliered Fruit Trees, Part 2", Apr. 7, 2009, online at http://www.waldeneffect.org/blog/Espaliered_Fruit_Trees_44_Part_2/, pp. 1-3.

* cited by examiner

*Primary Examiner* — June Hwu
(74) *Attorney, Agent, or Firm* — Smartpat PLC; Axel Nix

(57) ABSTRACT

A desired geometry of a plant is achieved in a simple way by means of a method for shaping one or more plants, whereby a dimensionally stable shaping device is used to delimit a growth space for the plant. The shaping device comprises at least one light permeable shaping element. Once shaping is complete the shaping device is removed.

13 Claims, 3 Drawing Sheets

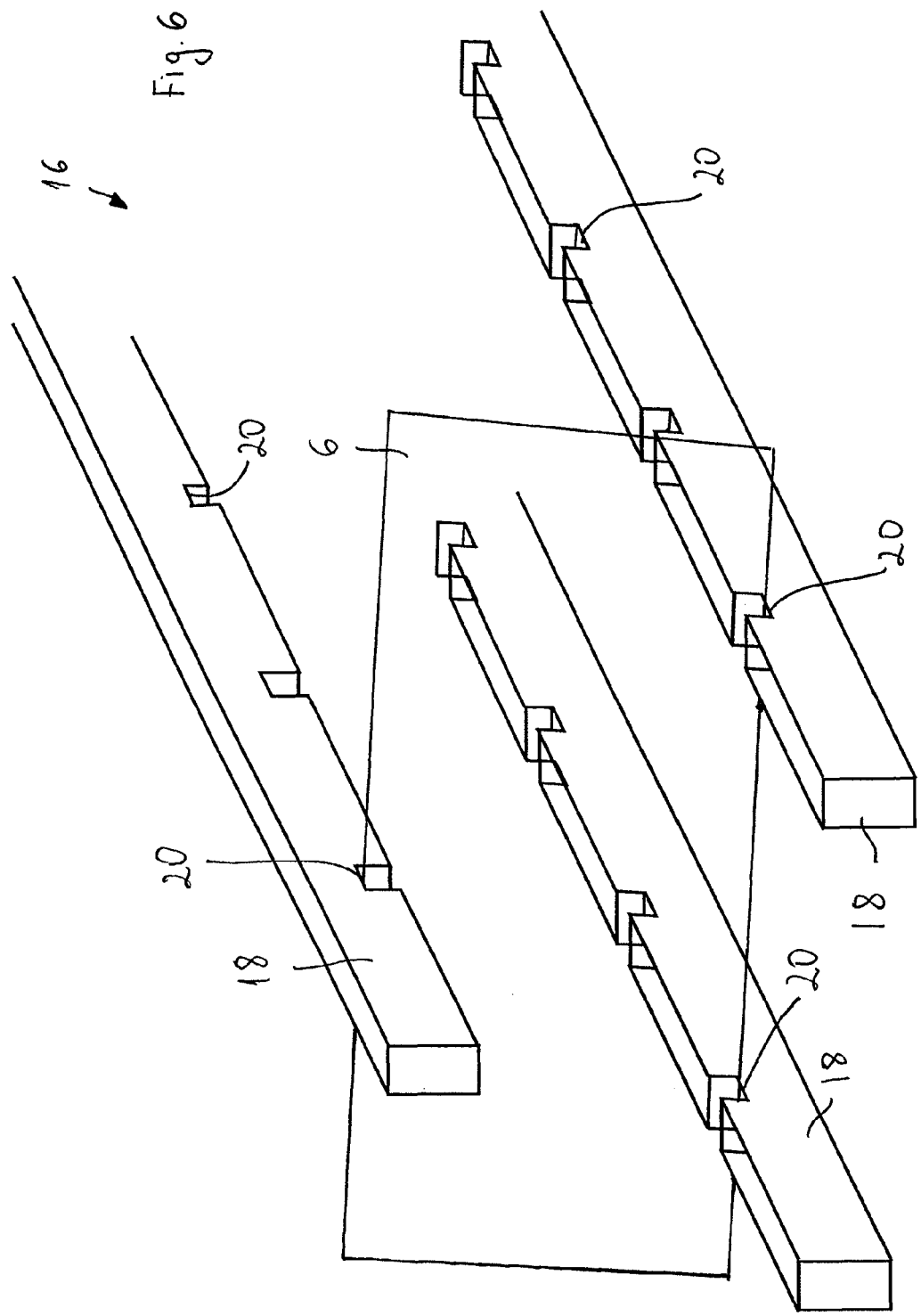

SYSTEM AND METHOD FOR SHAPING PLANTS

TECHNICAL FIELD

The present disclosure relates to a method for shaping plants, and more particularly to a method for shaping plants using a shaping device.

BACKGROUND

Decorative, not naturally occurring, shapes of a plant are often achieved through cutting, guiding with wires, frames etc. For a regular shaped cutting of plants, such as for example boxwood, shapes made from strong wire mesh are in particular used, which are pushed over the young boxwood plant. Any branches that project will be cut back or bound to maintain the shape. This requires an extensive and cost intensive work effort, in particular for gardening companies or tree nurseries that pre-grow trees, hedge plants etc.

It is the purpose of the present disclosure to provide a method for shaping one or more plants, in particular garden plants or house plants, with which a desired geometry of the plant can be achieved in a simple way.

SUMMARY

A method for shaping plants is presented, which uses a dimensionally stable shaping device to delimit a growth space for a plant. The shaping device comprises at least one light permeable shaping element, which is arranged on a side or above the plant. The shaping element restricts the growth of the plant along the shaping element, and thereby forces the plant to assume the shape of the shaping element. A plant may be shaped at one location, e.g. at a nursery, and transplanted to its final location following removal of the shaping device. Alternatively, the shaping device can also be used at a final location to shape a plant, and removed once the intended shape has been achieved.

Shaping of a plant is achieved by use of a shaping device which comprises one or more dimensionally stable and light permeable shaping elements arranged on certain sides of the plant. A desired shape of the plant is thus achieved by arranging and combining the shaping elements. In contrast to known methods for decorative plant design, shaping of the plant is achieved without cutting, bending, or the use of complex design structures. Instead, the plant itself adjusts its growth to the shape of the shaping elements. The shaping elements are solid and cannot be permeated by the plant. By not allowing any part of the plant to grow outside the desired shape established by the shaping elements, cutting of unwanted plant parts is avoided. This makes it quicker and simpler for the plant to assume the desired shape, as growth of the plant is directed into the desired shape. No excess growth outside the desired shape needs to be cut, which significantly reduces the work effort of shaping a plant compared to traditional methods. The disclosed method is therefore particularly suitable for commercial companies dealing with the growing of trees, hedges, house plants etc.

With the suggested method plant shapes not occurring in nature can be created, for example umbrella-shaped plants with a flat top, or seemingly two-dimensional plants with very little depth. These shapes can be achieved through suitable arrangement of shaping elements, in particular one or two shaping elements.

To allow air exchange and/or to lower humidity, the growth space for the plant is open on at least one side, at the top or at the bottom. If several shaping elements are used these may be arranged so tightly together that the growth space is enclosed with the exception of the entry point of the plant into the shaping device, e.g. the growth space is open only at the bottom. The shaping elements may also extend down to the ground or even down onto the roots, in which case the growth space is open at the top or the side. Alternatively, the plant is enclosed in the shaping device, whereby access to the plant, where necessary, is enabled in such a way that the shaping device comprises several sections, and one or more shaping elements can be removed.

The shaping device is dimensionally stable and serves for diverting the growth of the plant. The shaping device preferably comprises one or more shaping elements that delimit an expansion of the plant vertical to the plane of the shaping elements. The shaping elements are in direct contact with the plant. The plant grows against the shaping elements and is guided along the respective shaping element against its natural growth. Each shaping element acts upon the plant from a certain side and delimits its expansion. The plant can, however, spread along the shaping elements. For this the shaping device in particular acts upon the above ground sections of the plant, e.g. the shaping elements are positioned above the roots at a distance from the ground. Alternatively, the shaping device acts also on the root section of the plant.

The at least one shaping element forms a continuous surface, e.g. it does not comprise a mesh or grid-like structure unlike the known shapes for boxwood plants. As the shaping elements are light permeable they allow leaf growth and assimilation within the growth space. The shape and size of the shaping element can be chosen freely. A single shaping element preferably acts upon a maximum of half of the plant. The plant grows within the growth space until the desired shape and size have been reached. The shaping device is then removed. In order to maintain the shape and possibly the size the plant is usually regularly trimmed.

The disclosed method for shaping plants is suitable for woody plants such as for example box, privet, hornbeam, ficus and bay trees. Plants shaped according to the disclosed method for shaping plants may be used as room decoration, visual dividers on balconies or window sills, or as architectural interior and exterior design elements. The disclosed method is suitable for plants from the size of a kitchen window to visual hedge dividers on balconies and even avenue trees.

With the suggested method shaping of a plant is facilitated by the one or more shaping elements, which establish a growth space for the plant that is open in at least one direction. The growth space is open on two opposite sides of the shaping element, or alternatively the growth space is open at all edges on each of the shaping elements.

Shaping elements may be flat or have a curved surface. A shaping element may hence extend in a plane, or in a concave, convex, or free shaped curve. Consequently, a plant shaped by the shaping device will have a flat or curved side. Often flat shaping elements will be preferred. However, the surface of a shaping element may also be curved, for example in the form of waves.

A shaping device may comprise two flat shaping elements that are positioned approximately parallel to each other. The two shaping elements delimit the growth space in one of the three spatial directions to the area between the two shaping elements. The growth space of the plant remains open in the other two spatial directions. A plant located between the two shaping elements can expand sideways, upward, and downward along the shaping elements into the growth space. With the side delimitation on both sides of the growth space of the plant created by the two flat shaping elements a flat plant structure of branches and twigs is produced. Such "flat" plants are for example used as extremely thin hedges for small plots or as privacy shields on balconies.

The distance between the two shaping elements is preferably less than one centimeter to a few dozen centimeters, for example between 0.5 centimeter and 100 centimeter. The distance between the two shaping elements defines the thickness of the plant.

A growing plant can put expansion force on shaping elements that limit its growth in a given direction. To maintain the position of a shaping plate spacers are provided between the two shaping elements so that the shaping elements will not be displaced under the pressure of the plant.

The shaping elements are preferably formed as a solid plate made of glass or plastic. Glass as well as a number of plastics such as for example acrylic glass (PMMA) are light permeable, rigid and dimensional stable in order to withstand the expansion force created during the growth of a plant.

Alternatively, shaping elements may be formed by a film which is held in position under tension. The film is for example a commercially available silage film. A film is particularly thin and light. The fact that the film is tensioned within a robust frame means it will not deform when exposed to the expansion force of the plant.

During the shaping of the plants shapes that clearly differ from the natural growth form, for example squares, rectangles, triangles or circles, can be achieved. Against this background the shaping element is preferably a circle or a polygon, in particular a regular polygon such as for example a square or a rectangle. To ensure that the plant adopts the exact shape of the shaping element shoots of the plant that extend over the edges of the shaping element are expediently cut off. The open side edge thus represent a guide for the clippers when cutting the leaves and branches of the plants that extend over the side edge. Alternatively, the shaping device is removed before the plant reaches the edges of the shaping elements. In this way a "natural growth image" approximating two dimensions is achieved.

With plants that prefer a shady location leaf burn may occur outdoors when the plant is enclosed by several glass or PMMA panes. To prevent leaf burn, only a part of the light is preferably allowed to permeate the at least one shaping element. This can be achieved by use of partially light permeable films, milk glass panes, or panes treated with a tint. The shaping elements may not be clear glass, but appear opaque or tinted.

The shaping device preferably comprises a fixture, to which the at least one shaping element is affixed. The fixture serves for positioning and orientating the shaping element in relation to the plant. The fixture is preferably attached in the ground or to a wall. The fixture may comprises slotted slats or slotted beams made of wood or plastic, whereby the shaping elements made of glass or plastic plates are inserted into the slots and can thus be held vertically.

Several plants are preferably positioned in a row between two flat plates located at a distance from each other and open at the sides for growing a hedge. A continuous hedge of little depth comprising several plants is thus formed between the two, preferably parallel, plates. Arrangements where several shaping elements are arranged in a row in a longitudinal direction of the hedge to form one long growth space for longer hedges are also conceivable.

A single shaping element can be positioned above a plant for creating an umbrella shape, for example a tree with a flat top. The shaping element above the plant allows the plant to expand in width but not in height. If the plant is a tree this means that the tree crown will be flat, so that the tree will form a kind of umbrella. This is of particular advantage for locations, for example public town locations, where shade is to be provided with the aid of the trees.

The following detailed description is merely exemplary in nature and is not intended to limit the invention or the application and uses of the invention. Furthermore, there is no intention to be bound by any theory presented in the preceding background or the following detailed description of the invention.

BRIEF DESCRIPTION OF THE DRAWINGS

FIG. 6 shows fixtures for shaping elements of a shaping device.

The same reference numbers are used across all figures to refer to elements serving the same function.

DETAILED DESCRIPTION

FIGS. 1 through 4 show different embodiments of a shaping device 2, which guides the above ground sections of a plant 4 to assume a desired geometric shape.

Figure 1:
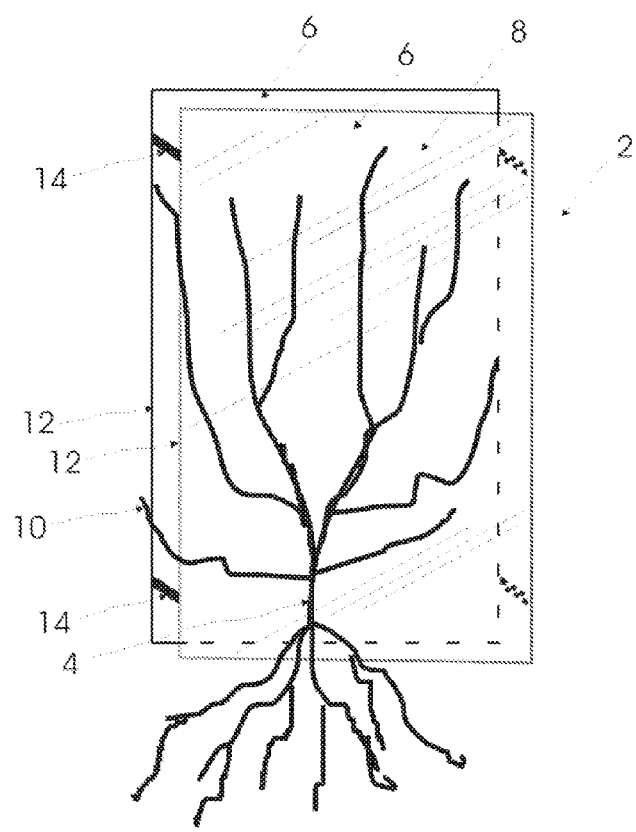
FIG. 1 illustrates a device for shaping a plant.
Figure 2:
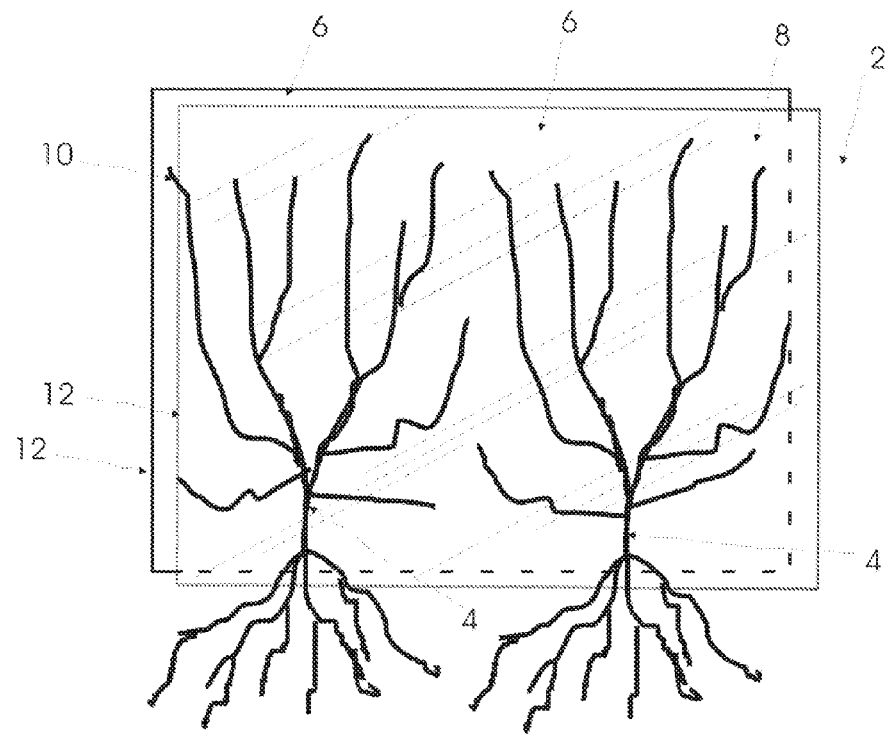
FIG. 2 illustrates a device for shaping several plants of a hedge.
Figure 3:
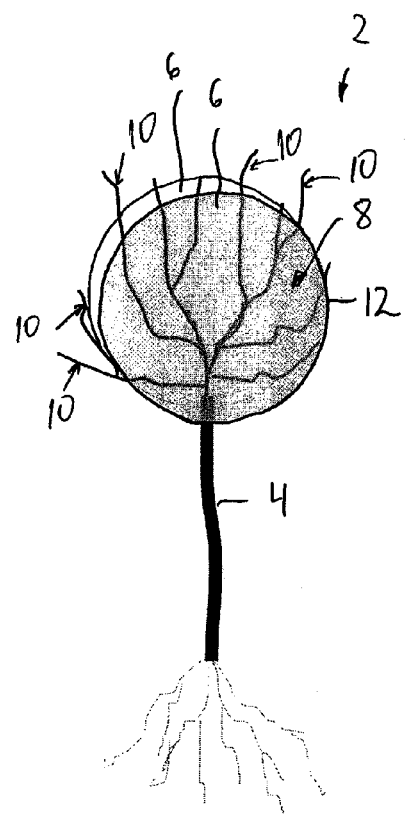
FIG. 3 illustrates a circular device for shaping a plant.

The shaping device 2 of FIGS. 1 to 3 comprises two shaping elements 6 located parallel to each other. Between shaping elements 6 a growth space 8 for the plant 4 is formed. Plant 4 grows and expands within growth space 8. Shaping device 2 is dimensionally stable, so that it withstands the expansion force when the plant 4 grows. Shaping device 2 is sufficiently stable to not be deformed by the growth of plant 4.

The shaping elements 6 are light permeable, so that plant 4 can develop normally when growing within growth space 8. Plant 4 cannot expand into or through shaping elements 6. The growth of the plant 4 vertically in relation to the shaping elements is delimited and plant 4 can expand only in between shaping elements 6. This causes plant 4 to grow very flat. The thickness of the plant is defined by the distance of the two shaping elements 6 and can vary from less than one centimeter for small pot plants to a few dozen centimeters for larger outdoor plants and trees, depending on the size of the plant. Typically, shaping elements 6 are spaced between 0.5 cm and 100 cm apart.

As depicted in FIGS. 1 to 3 shaping elements 6 of the shaping device 2 can have different geometries. The shaping elements 6 shown in FIG. 1 and FIG. 2 are of a rectangular design, and in FIG. 3 they are circular. Plants 4 growing in the growth space 8 between the shaping elements 6 are regularly trimmed at the open edges 12 of growth space 8. Consequently, plants 4 are rectangular or circular shaped, depending on the shape of the shaping element 6. Further forms of the shaping elements 6, in particular of the type of regular polygons such as for example triangles, pentagons, hexagons etc. are possible. For complex geometries of the plants 3D shaping elements can also be used.

The parallel arrangement of shaping elements 6 creates a growth space 8 for the plants 4 to expand in. Growth space 8 is open at the sides as well as the top and the bottom. In the illustrated embodiments the shaping elements 6 are arranged in such a way that the growth space 8 is open around all edges 12 of the respective shaping element 6. To ensure that the plants 4 take on exactly the form of the shaping elements 6, shoots 10 of the plant 4 that extend over the edges 12 of the shaping elements 6 are cut off.

In FIGS. 1 to 4 the shaping elements 6 are shown as plates which extend in a straight plane. The shaping elements 6 can, however, also have an arced structure having a concave or convex shape, similar to a bowl. In addition, the surface of the shaping elements 6 can form a profile, for example of waves. Two bowl-shaped shaping elements 6 can be placed facing each other, so that shaping device 2 encloses plant 4. In this case growth space 8 is kept open at the top and the bottom. In order to enable access to plant 4, the bowls can be separated from each other and rejoined when access to the plant is no longer needed.

Spacers 14 are provided to ensure that the distance between the two shaping elements 6 of a shaping device 2 will not change. These are schematically illustrated in FIG. 1. The guiding device 2 further comprises a fixture (not shown), to which shaping elements 6 are affixed.

Shaping elements 6 of FIGS. 1 to 3 are solid plates made of glass or acrylic glass (PMMA). Shaping element 6 may be formed as single piece of glass or PMMA. Alternatively, shaping element 6 may comprise of two or more pieces of glass or PMMA, which are joined together. Pieces of glass or PMMA may e.g. be joined by fasteners or glued together. Several pieces of glass or PMMA may also be joined together within a frame. Shaping element 6 of FIG. 4 is a film which is held under tension above plant 4.

In FIG. 2 the use of a shaping device 2 for growing a hedge is shown, whereby several plants 4 are arranged in a row within growth space 8 between two shaping elements 6 that extend along several plants 4.

Figure 4:
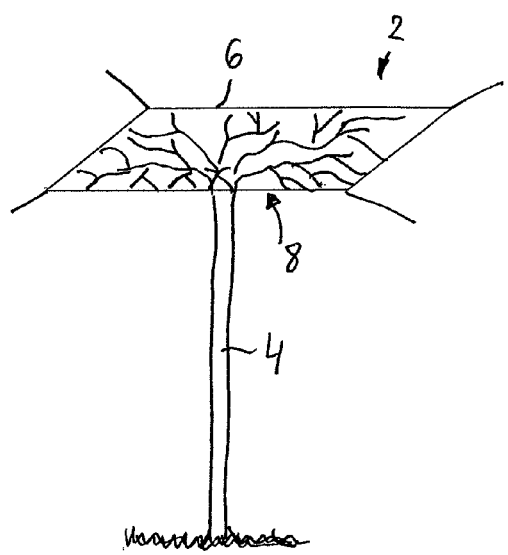
FIG. 4 illustrates a device for shaping a plant having a flat top.

Shaping device 2 of FIG. 4 comprises only one shaping element 6, which is arranged above plant 4. Using the shaping device 2 as configured in FIG. 4 causes plant 4 to have a flat top surface and become umbrella-shaped.

Figure 5:
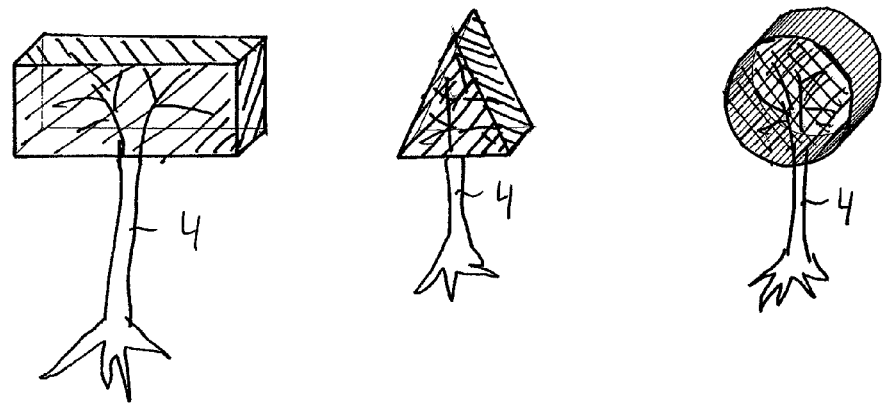
FIG. 5 shows decorative plants with different geometries.

Once the desired shape of the plant 4 has been reached, the shaping device 2 is removed. Different geometrical shapes of plants 4 can be achieved with differently shaped shaping devices 2 as shown in FIG. 5. These shapes are maintained by regularly cutting off shoots of plants 4 that grow beyond the shaping device.

In addition to "flat" plate-shaped plants more complex shapes can also be produced with the shaping device 2, such as for example arcs, spirals or organic shapes such as a heart or shell.

An exemplary design fixture 16 which holds shaping elements 6 is shown in FIG. 6. A fixture 16 comprising several slats 18 is provided. In the simplest case the slats 18 are, for example, roofing slats into which several parallel slots 20 have been cut. As illustrated, three slats 18 are provided, whereby two of these are arranged on the ground at a distance from each other. Depending on the desired result during the shaping of the plants to be positioned between the slats 18 the distance between the slats 18 on the ground will be less than one centimeter to some meters. A shaping element 6, for example a glass pane or a disc, is placed into two oppositely located slots 20 of the two ground slats 18. To ensure that shaping element 6 is held vertical a third slat 18 is provided, which holds the shaping element 6 from above. The plurality of slots 20 make it possible together with the fixture 16 to arrange several shaping elements 6 in parallel behind each other, between which several plants can grow in a desired shape.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A system comprising a vertically oriented growing plant, rooted in soil, with an above-ground portion of the plant placed within a device comprising:
   a first removable shaping element consisting of a flat, light permeable, plate extending in a straight plane, and
   a second removable shaping element consisting of a flat, light permeable, plate extending in a straight plane,
   wherein the first removable shaping element and the second removable shaping element are arranged approximately parallel to each other between 0.5 centimeters and 100 centimeters apart, forming a growth space for the plant located between the first removable shaping element and the second removable shaping element, and
   wherein the first removable shaping element and the second removable shaping element limit the plant's growth to the growth space, allowing the plant to expand only sideways, upwardly, and downwardly along the removable shaping elements, thereby causing the plant to assume a flat shape with little depth suitable for use as a narrow hedge or privacy shield.

2. The system as in claim 1, further comprising spacers which are provided between the first and the second removable shaping element, the spacers being configured to hold the removable shaping elements in place against an expansion force of the plant growing in the growth space between the removable shaping elements.

3. The system as in claim 1, wherein the first and the second removable shaping elements are made of glass or plastic.

4. The system as in claim 1, wherein the first and the second removable shaping elements are a film that is held under tension.

5. The system as in claim 1, wherein the first or the second removable shaping element is partially light permeable.

6. The system as in claim 1, further comprising a fixture, to which at least one of the shaping elements is affixed.

7. The system as in claim 1, wherein the growth space is free of mesh or grid-like structures.

8. The system as in claim 1, wherein the first and the second removable shaping elements are positioned at a distance from the ground above the roots of the plant between the first and the second shaping element.

9. A method for shaping a plant comprising:
   providing a vertically oriented growing plant rooted in soil, with an above-ground portion of the plant placed between a first removable shaping element and a second removable shaping element;
   growing the plant into a desired shape at a first location;
   removing the first removable shaping element and the second removable shaping element; and
   transplanting the plant to a second location,
   wherein the first removable shaping element and the second removable shaping element each consist of a flat, light permeable, plate extending in a straight plane,
   wherein the first removable shaping element and the second removable shaping element are arranged approximately parallel to each other between 0.5 centimeters and 100 centimeters apart, forming a growth space for the plant located between the first removable shaping element, and the second removable shaping element, and wherein the first removable shaping element and the second removable shaping element limit the plant's growth to the growth space, allowing the plant to extend only sideways, upwardly, and downwardly along the removable shaping elements, thereby causing the plant to assume a flat shape with little depth suitable for use as a narrow hedge or privacy shield.

10. The method as in claim 9, further comprising the step of trimming shoots of the plant that extend over an edge of the first or the second shaping element.

11. The method as in claim 9, wherein the plant is selected from the group consisting of boxwood, privet, hornbeam, ficus, and bay trees.

12. A method for shaping two or more plants into a narrow hedge comprising:
    providing two or more vertically oriented growing plants rooted in soil, with an above-ground portion of the plants placed in a row between a first removable shaping element and a second removable shaping element;
    growing the plants into a desired shape at a first location;
    removing the first removable shaping element and the second removable shaping element; and
    transplanting the plants to a second location,
    wherein the first removable shaping element and the second removable shaping element each consist of a flat, light permeable, plate extending in a straight plane,
    wherein the first removable shaping element and the second removable shaping element are arranged approximately parallel to each other between 0.5 centimeters and 100 centimeters apart, forming a growth space for the plants located between the first removable shaping element, and the second removable shaping element, and
    wherein the first removable shaping element and the second removable shaping element limit the plants' growth to the growth space, allowing the plants to extend only sideways, upwardly, and downwardly along the removable shaping elements, thereby causing the plants to assume a flat shape with little depth suitable for use as a narrow hedge or privacy shield.

13. The system as in claim 1, wherein the first removable shaping element and the second removable shaping element are held in a fixture made of several slats, each of the several slats comprising a plurality of parallel slots.

* * * * *